United States Patent
Ito et al.

(10) Patent No.: US 7,239,318 B2
(45) Date of Patent: Jul. 3, 2007

(54) METHOD AND COMPUTER SOFTWARE PROGRAM PRODUCT FOR PROCESSING CHARACTERS BASED ON OUTLINE FONT

(75) Inventors: Masatoshi Ito, Miyagi (JP); Shunsuke Futakuchi, Miyagi (JP)

(73) Assignee: Rise Kabushikikaisha, Miyagi (JP)

( * ) Notice: Subject to any disclaimer, the term of this patent is extended or adjusted under 35 U.S.C. 154(b) by 1323 days.

(21) Appl. No.: 10/007,991

(22) Filed: Dec. 5, 2001

(65) Prior Publication Data

US 2004/0012591 A1   Jan. 22, 2004

(30) Foreign Application Priority Data

Mar. 23, 2001   (JP)   ............... 2001-130346

(51) Int. Cl.
   *G06T 11/00*   (2006.01)
(52) U.S. Cl. .............. 345/467; 345/469.1; 345/470; 345/471
(58) Field of Classification Search .......... 345/467, 345/468, 469, 469.1, 470, 471, 472.1
   See application file for complete search history.

(56) References Cited

U.S. PATENT DOCUMENTS

| | | |
|---|---|---|
| 5,042,075 A | 8/1991 | Sato |
| 5,280,576 A | 1/1994 | Cao |
| 5,526,476 A | 6/1996 | Motokado et al. |
| 5,714,987 A | 2/1998 | Otsuka |
| 5,754,164 A | 5/1998 | Yutani et al. |
| 5,818,459 A | 10/1998 | Kurumida |
| 5,859,647 A | 1/1999 | Kurumida |
| 5,867,174 A | 2/1999 | Aoki et al. |
| 5,898,439 A | 4/1999 | Takazawa |
| 5,917,501 A | 6/1999 | Muller et al. |
| 6,157,750 A | 12/2000 | Choi et al. |
| 6,232,987 B1 | 5/2001 | Choi et al. |

FOREIGN PATENT DOCUMENTS

DE   19713654 A1   10/1997

(Continued)

OTHER PUBLICATIONS

Patent Abstract of Japan, "Stroke Extracting Device", Takeo et al., Published Sep. 28, 1990, Publication No. 02-244390.

(Continued)

*Primary Examiner*—Kee M. Tung
*Assistant Examiner*—Motilewa Good-Johnson
(74) *Attorney, Agent, or Firm*—Haynes and Boone, LLP

(57) ABSTRACT

A method and computer software product for processing outline fonts is described to skeletonize character fonts based on their outline data. The method may comprise: reading font data from an outline font dictionary that stores the outline data of an outline font, preparing element structures and constructing a graphic path; determining whether or not the element structures constitute another graphic path; determining whether or not, within the graphic path, there is another graphic path that is completely contained and has the same cyclic direction as the graphic path, if there is, then, deleting the other graphic path; and moving the element structures that constitute the graphic path by a predetermined distance to the direction of character width based on the character width of the outline font, thereby to output a plurality of line segments which effectively eliminates the character width of the outline font.

10 Claims, 16 Drawing Sheets

FOREIGN PATENT DOCUMENTS

| | | |
|---|---|---|
| GB | 2313028 | 11/1997 |
| JP | 06175638 A | 6/1994 |
| JP | 06175639 A | 6/1994 |
| JP | 08146936 A | 6/1996 |

OTHER PUBLICATIONS

Patent Abstract of Japan, "Connection Processing Method in Core Wiring of Line Graphic", Makoto, Published Jun. 8, 1999, Publication No. 11-154236.

Patent Abstract of Japan, "Character Processing Device", Hajime et al., Published Jan. 23, 1998, Publication No. 10-020846.

Patent Abstract of Japan, "Method and Device for Processing Typeface Information", Hiroko, Published Oct. 13, 1995, Publication No. 07-262390.

Patent Abstract of Japan, "Device and Method for Generating Calligraphic Data in Calligraphic Character Drawing Device", Kenichi et al., Published Aug. 6, 1992, Publication No. 04-216079.

Patent Abstract of Japan, "Processing System for Vector Character", Yukie et al., Published Dec. 22, 1989, Publication No. 01-318177.

PRIOR ARTS

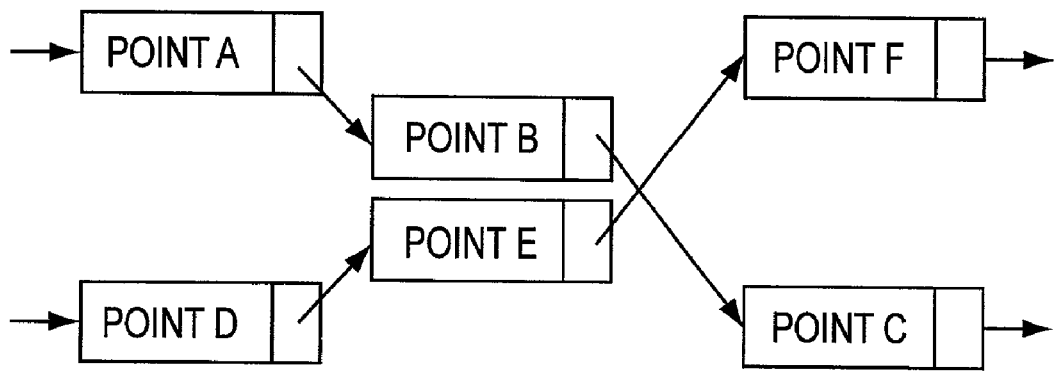
F I G. 6A
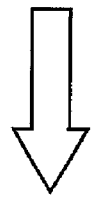
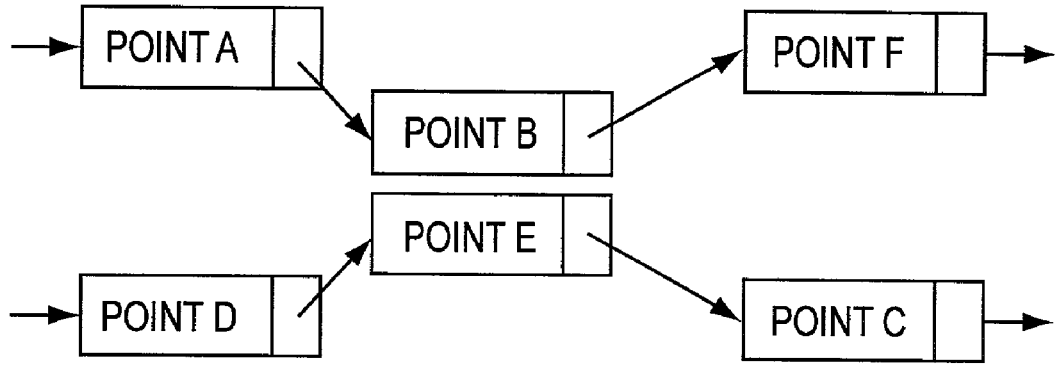
F I G. 6B

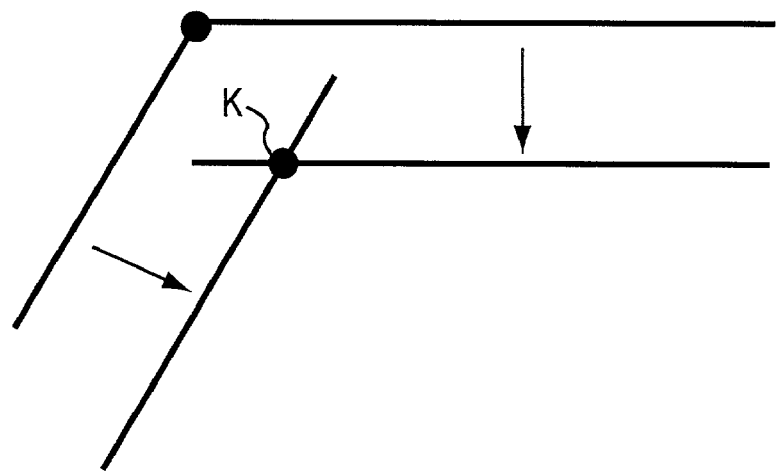
F I G. 12
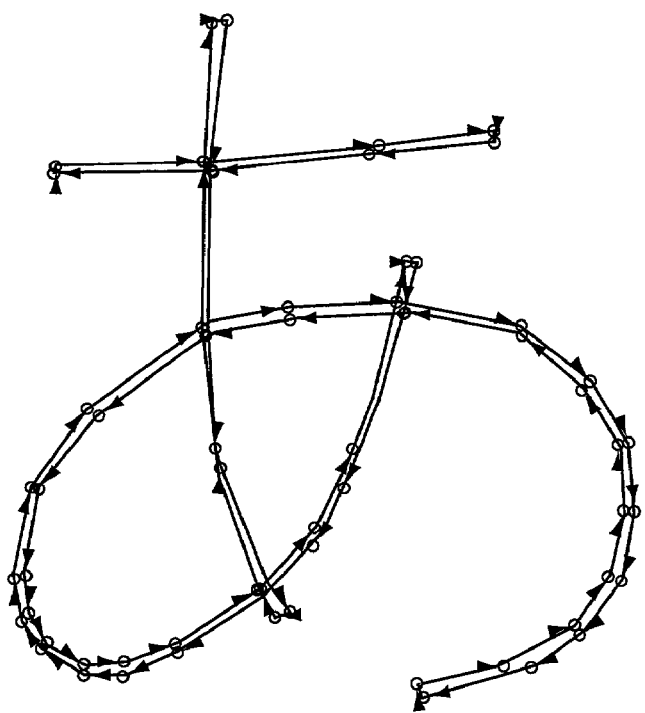
F I G. 13

ENGLISH

ARABIC

KOREAN

METHOD AND COMPUTER SOFTWARE PROGRAM PRODUCT FOR PROCESSING CHARACTERS BASED ON OUTLINE FONT

This application claims the benefit of Japanese Patent Application No. 2001-130346 filed on Mar. 23, 2001, the entire contents of which are incorporated by reference.

BACKGROUND OF THE INVENTION

The present invention generally relates to a method for transforming outline font data of a character into its framework and decorating the character based on the framework thereof.

Fonts used in word-processors and personal computers roughly comprise bitmap fonts and outline fonts. Of these, outline fonts are plotted by forming an outline and filling the area surrounded by the outline, thus are characterized in that they can display or print high quality characters with few jaggy even when the character size has been changed or the character has been rotated.

The data that expresses outline fonts is stored as an outline font dictionary in a hard disk or a ROM. Then, when a character is plotted, the outline font data that corresponds to the character is read from the outline font dictionary, and after the prescribed processing has been done, the character will be plotted in a display device or by means of a printer.

This outline font expresses a character by enclosing it with an outline. Therefore, it has a problem that it is difficult to decorate a character expressed in an outline font by changing the character width or by making the character three-dimensional, among other ornamental modifications.

In other words, this ornamental modification is usually made to characters that are expressed in skeletal structures. FIG. 1A illustrates the skeletal structure of a Japanese "hiragana" character corresponding to the phonetic symbol, "a." It is easy to apply various ornamental modifications to this skeletal structure.

On the other hand, the outline font of this character is illustrated in FIG. 1B. As illustrated in FIG. 1C, this font, for instance, comprises a plurality of polygonal cyclic graphic paths 1a–1f. Each graphic path comprises a plurality of continuous outlines (line segments).

To decorate this outline font, we could adopt a method to make the lines finer by reducing each polygon toward the center of width. When a line is made finer in this method, however, the result will be as illustrated in FIG. 1D. The character shape may be deformed as can be noticed when we compare it with FIG. 1A.

In another method, the line may be made finer by converting it to bitmap data. However, in this method, the outline of the character may be deformed when it is converted to bitmap, and consequently, it is difficult to obtain a good result when the line is finally made finer.

BRIEF SUMMARY OF THE INVENTION

This invention was made taking this situation into consideration. The primary object is to provide a method and a computer software program product to appropriately skeletonize character fonts based on their outline data.

Also, a further object of this invention is to provide a method and a computer software program product to apply various ornamental modification processes to outline fonts.

According to the first aspect of this invention, a method for processing an outline font is provided, which comprises (a) a step of reading font data from an outline font dictionary that stores outline data of an outline font which is divided into a plurality of sections, (b) a step of constructing a polygonal cyclic graphic path by preparing a plurality of element structures comprised of data that lets the outline of an outline font plotted, based on the aforementioned font data that has been read, and by connecting each element structure in sequence, (c) a step of determining whether or not the element structures that constitute the aforementioned polygonal cyclic graphic path intersect with element structures that constitute another graphic path, to add a nodal point at the intersecting part when they intersect, and to exchange the paths at this nodal point so that the element structures that constitute respective polygonal cyclic graphic paths will not intersect with each other, (d) a step of determining whether or not another polygonal graphic path exists, which is completely contained within one polygonal graphic path and also has the same cyclic direction, and to delete said other polygonal graphic path when it exists, and (e) a step of moving the element structures that constitute the aforementioned polygonal cyclic graphic path in the character width direction by a prescribed distance based on the character width of this outline font, and thereby to output a plurality of line segments comprised by deleting the character width of the aforementioned outline font.

According to this configuration, it will be possible to apply ornamental modification process to outline fonts, to which it was difficult in the past to apply ornamental modifications such as shape transformation related to polygonal framework. That is, in this invention, first, intersections and overlapping of a plurality of polygonal cyclic graphic paths are removed. That is, outline fonts such as the True Type font are comprised of polygons enclosed by several polygonal cyclic graphic paths. However, it has a principle that the areas in which both clockwise and counterclockwise polygons overlap will not be plotted. In this invention, a process is applied to delete the parts wherein polygons intersect so as to cause easier skeletonizing and ornamental modification processes. Also, to express an outline font with the minimum elements, a polygon contained inside of another polygon having the same cyclic direction is removed.

Next, skeletonizing process is applied to the outline font processed in this manner. According to one embodiment of this invention, this skeletonizing process comprises a step of obtaining the character width of the outline font based on the aforementioned polygonal graphic paths, a step of moving each continuous line segment in the aforementioned character width direction by a distance that is half of the character width, and to set the nodal point of each line segment in that case as a new point that constitutes the aforementioned polygonal cyclic graphic paths, and a step of synthesizing two adjacent line segments into one line segment by substituting the coordinates of two points adjacent in the character width direction with the coordinate of the midpoint of the two points.

Here, to compute the character width of an outline font, for instance, with regard to a pair of line segments that constitute the aforementioned character width, the sum of all products obtained by multiplying the distance from one line segment to the other line segment by the length of said one line segment and adding the products for all line segments, is divided by the mean length of all line segments.

After the outline has been skeletonized in this manner, to obtain a table of connected line segments, a plurality of polygons are divided by line segments, and a table of non-overlapping line segments is prepared. Then, at the connecting points of such line segments, lines are connected in sequence, and where more than two line segments meet two line segments having the least difference in their slopes are connected, thereby the line segments are interconnected. In this manner, the skeletonized line segments will be smoothly connected, and as a result, a framework data that complies with the stroke order of the character can be obtained.

Then, to the lines that constitute this obtained framework data, for instance, by defining the three-dimensional structure in a form determined in the direction perpendicular to the direction of the line, ornamental modifications to this character can be processed.

Also, according to the second aspect of this invention, a computer software program is provided, which is a computer software program product to cause a computer processing system to process outline fonts, and comprises a storage medium, a font data read command stored in this storage medium, which causes the aforementioned computer system to read font data from an outline font dictionary that stores outline data of an outline font divided into a plurality of sections, a path constructing command stored in the aforementioned storage medium, which causes the aforementioned computer system to prepare a plurality of element structures comprised of the data that lets the outline of an outline font be plotted based on the aforementioned font data, which has been read, and to construct a polygonal cyclic graphic path by connecting each element structure in sequence, a path exchange command stored in the aforementioned storage medium, which causes the aforementioned computer system to determine whether or not the element structures that constitute that aforementioned polygonal cyclic graphic path intersect with the element structures that constitute another graphic path, to add a nodal point at the intersecting part when they intersect, and to exchange paths at this nodal point so that the element structures that constitute each polygonal cyclic graphic path will not intersect with one another, a polygonal cyclic graphic path deleting command stored in the aforementioned storage medium, which causes the aforementioned computer system to determine whether or not another polygonal graphic path with the same cyclic direction, which is completely contained in one polygonal graphic path, exists, and to delete said other polygonal graphic path if it exists, and a skeletonizing command stored in the aforementioned storage medium, which causes the aforementioned computer system, with regard to a character comprised of the aforementioned polygonal cyclic graphic paths, to output the aforementioned character as a plurality of line segments without character width by processing line segments that are opposite in the character width direction based on the character width so as to let them approach each other.

According to this configuration, it will be possible to cause a computer system to run the outline processing method explained in detail above.

Other features of this invention, its action and effects will be clearly understood by the people who are skilled in the area by referring to the following section titled, Detailed Description of the Preferred Embodiment, and the attached drawings.

BRIEF DESCRIPTION OF THE DRAWINGS

FIGS. 6A and 6B are diagrams to explain path exchange between graphic paths.

FIG. 12 is a diagram on line segment connection when the area is scaled down.

FIG. 13 is a diagram of an outline font after the area has been scaled down.

DETAILED DESCRIPTION OF THE PREFERRED EMBODIMENT

Preferred embodiments of the present invention will be described in detail below with reference to the accompanying diagrams.

Figure 1A:
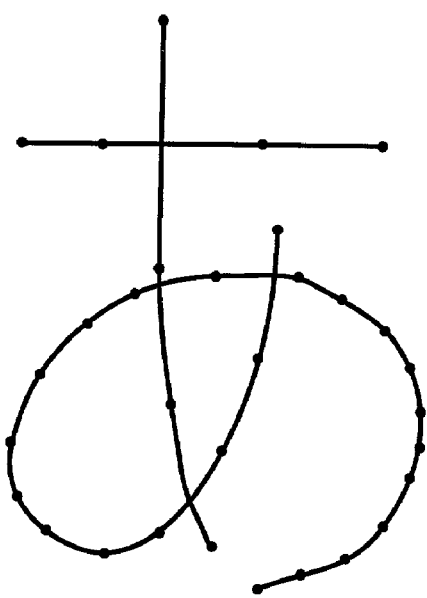
FIGS. 1A–1D illustrate examples of common outline fonts.
Figure 1B:
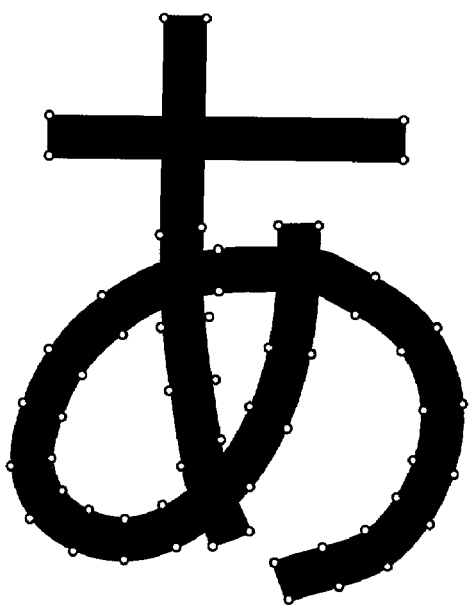
Figure 1C:
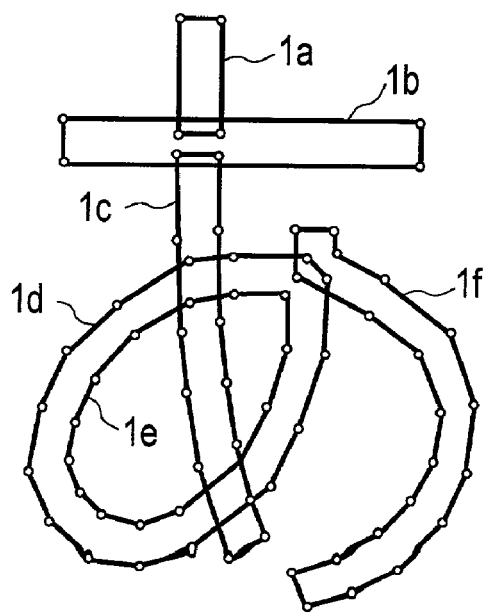
Figure 1D:
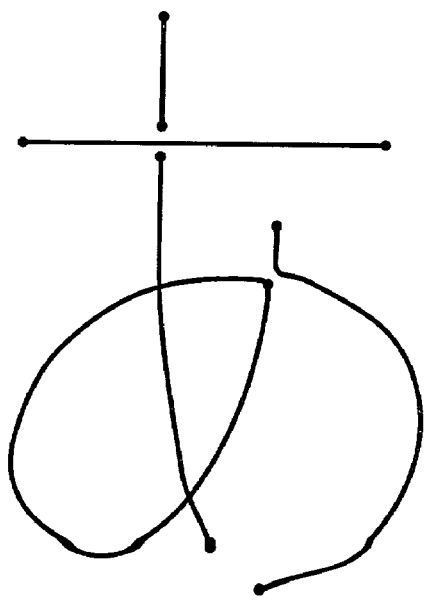
Figure 2:
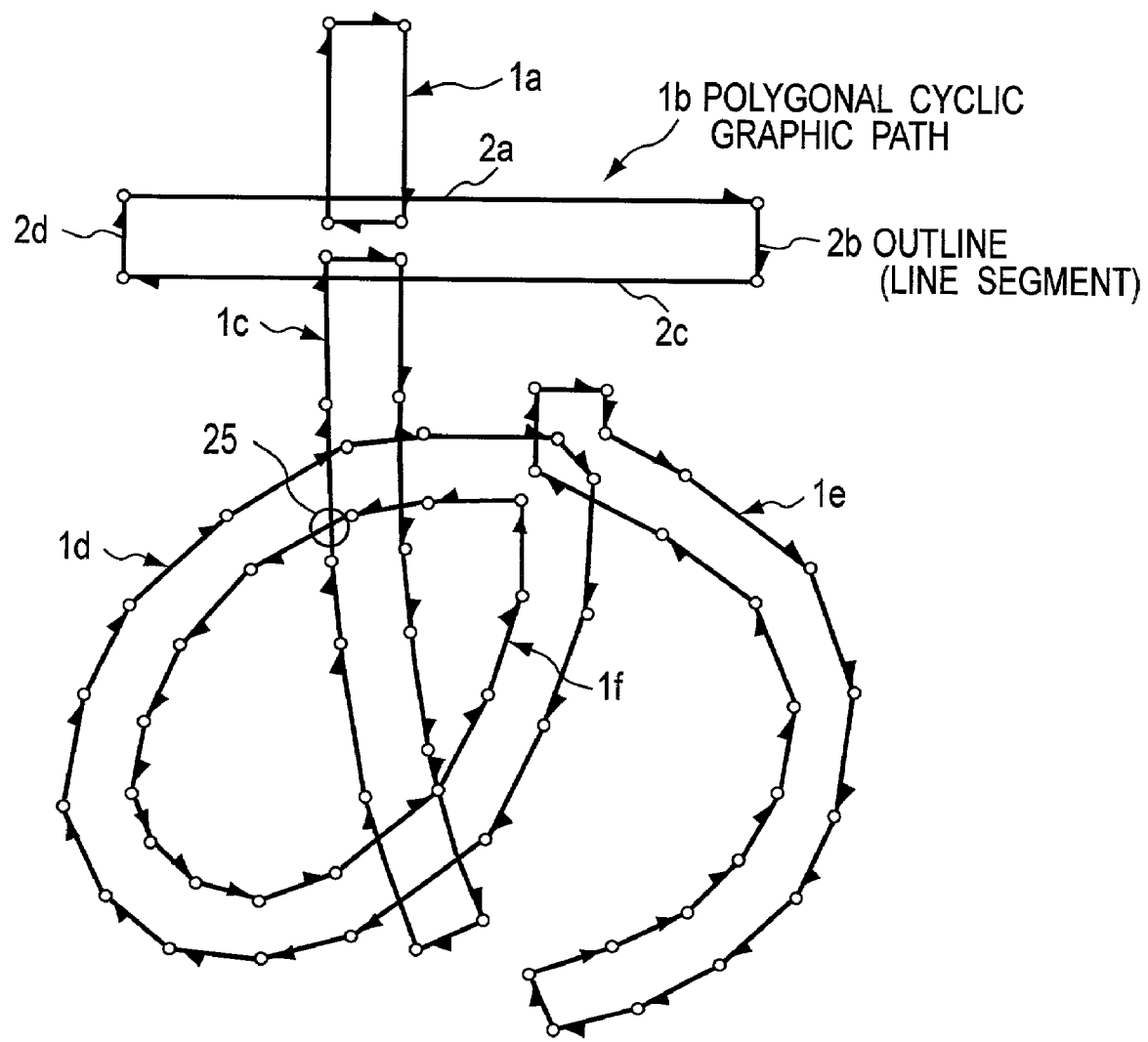
FIG. 2 illustrates an example of the outline font processed in one embodiment of this invention.

FIG. 2 illustrates graphic paths that constitute the outline font of a Japanese phonetic alphabet "hiragana" corresponding to the phonetic symbol "a." This outline font comprises six cyclic graphic paths keyed as 1a to 1f. Hereafter, these cyclic graphic paths will simply be called "polygons" to simplify the explanation.

Of the aforementioned polygons 1a to 1f, 1a to 1e express the plotting area for the font, and the polygon 1f expresses the cutout area to reverse the plotting area. Each polygon, 1a to 1f, suppose the polygon 1b is taken as an example, is comprised so that the outlines 2a to 2d comprised of line segments (element structures) having a starting point and an ending point are connected along a certain cyclic direction so as to enclose a prescribed area. Here, the arrow attached to each outline (line segment) 2a to 2d indicates the cyclic direction (clockwise or counterclockwise). The difference between the plotting area and the cutout area is distinguished by the fact whether the cyclic direction of the element structure that constitutes the aforementioned polygon comprises clockwise or counterclockwise direction.

Figure 3:
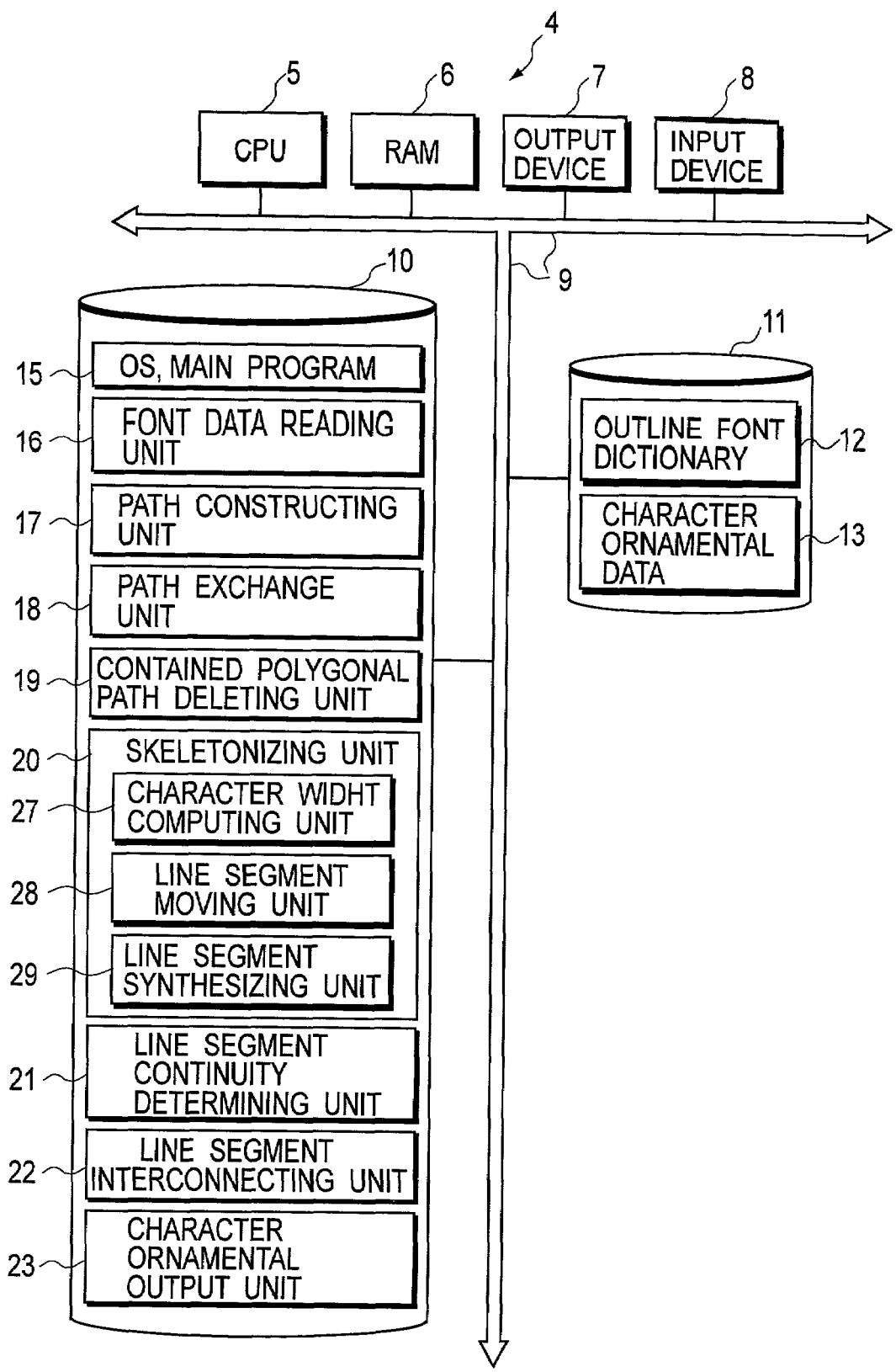
FIG. 3 illustrates the system configuration of an embodiment of this invention.

FIG. 3 is an outline block diagram, which illustrates the system 4 to apply ornamental modification process to the aforementioned outline font.

This system 4 is comprised by connecting a program storage unit 10 and a data storage unit 11 to a bus 9 to which a CPU 5, a RAM 6, an input device 7 and an output device 8 are connected.

To explain only the units that relate to this invention, the data storage unit 11 stores an outline font dictionary 12 and character ornamentation data 13.

The program storage unit 10 stores, besides the OS/main program 15, a font data reading unit 16, a path constructing unit 17, a path exchange unit 18, a contained polygonal path deleting unit 19, a skeletonizing unit 20, a line segment continuity determining unit 21, a line segment interconnecting unit 22, and a character ornamental modification unit 23.

Each of these components 12–23 in reality comprises a computer system, a certain area secured in a storage medium such as a hard disk or a semiconductor memory provided in this computer system, and a computer software program installed in the area. Then, whenever the aforementioned CPU 5 calls these onto the aforementioned RAM 6 and run them, the function of this invention will be realized.

Next, detailed function of each of the aforementioned components 12–23 will be explained along with its operation.

Figure 4:
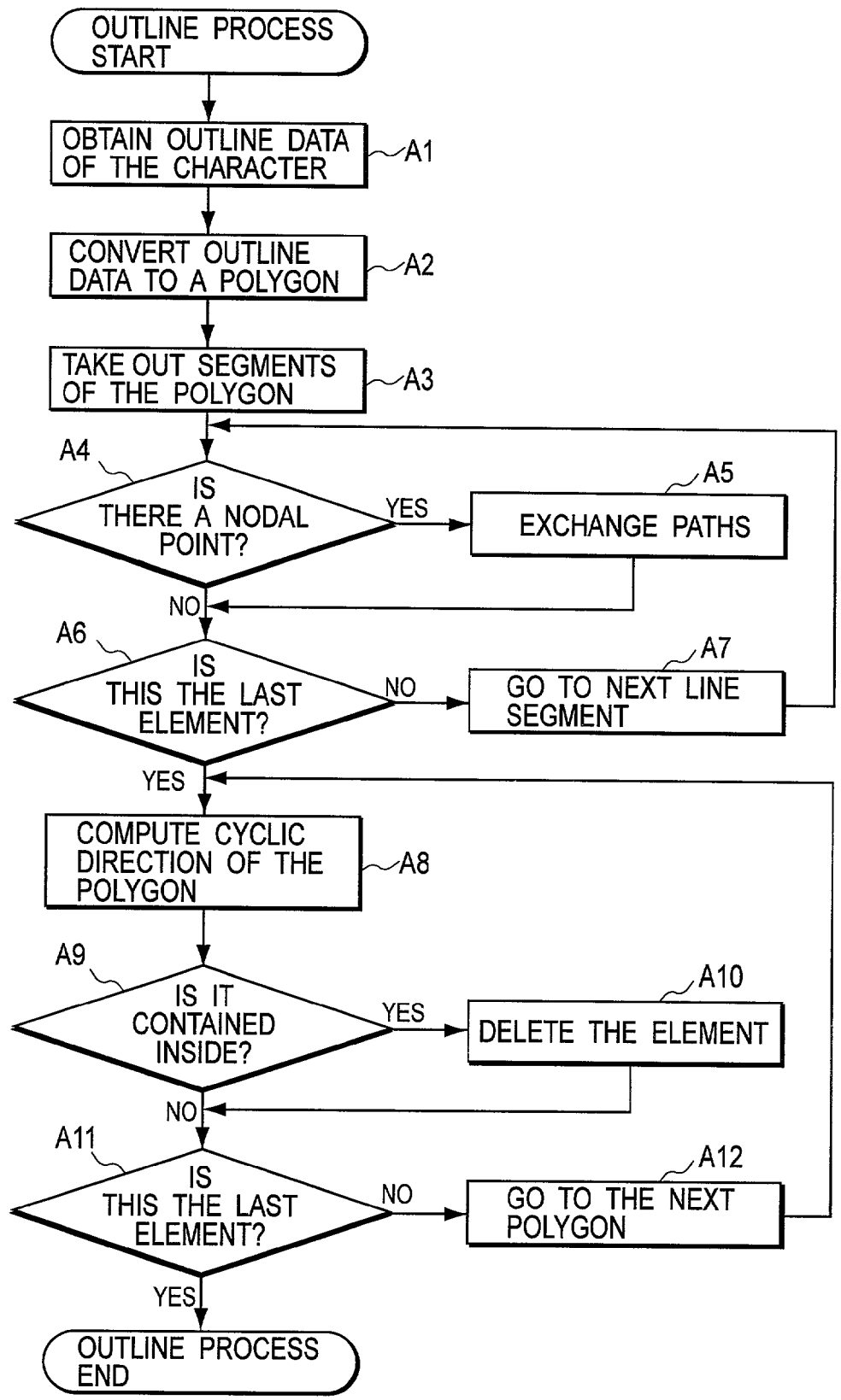
FIG. 4 is a flowchart that illustrates the outlining process for an outline font.

First, in reference mainly to the flowchart in FIG. 4, the outline processing functions of the aforementioned font data reading unit 16, path constructing unit 17, path exchange unit 18, and contained polygonal path deleting unit 19 will be explained. The aforementioned font-data reading unit 16 has the function of reading desired outline font data from the aforementioned outline font dictionary 12. This outline font dictionary 12 was prepared assuming that the outline of an outline font is partitioned into a plurality of sections comprised of line segments and curves, and that the outline of each section is plotted in sequence on a dictionary coordinate system preset in the outline font dictionary to form an outline.

The aforementioned path constructing unit 17 issues a command to the aforementioned font data reading unit 16 so as to call the outline font data that corresponds to the character designated as the object of processing. Then, this path constructing unit constructs each outline (element structure) on the RAM area based on the read data (Step A1 in FIG. 4), and constructs a polygon (polygonal cyclic graphic path) by connecting these outlines in sequence (Step A2). In this manner, the graphic data such as illustrated in FIG. 2 is constructed in the RAM area.

In this graphic data illustrated in FIG. 2, for instance, as in the case of the part encircled in a circle 25 in this figure, the outlines that constitute each polygon intersect with one another. The aforementioned path exchange unit 18 applies the exchange process for the graphic paths in Step A3 and thereafter in FIG. 4, to remove these intersections from the graphic data in FIG. 3

First, the aforementioned path exchange unit 18 applies the process of taking out the line segments from the polygon (Step A3). Then, it determines whether the line segment taken out intersects with other line segments or not (Step A4). If it does intersect, a nodal point is added to the intersecting part and the paths are exchanged (Step A5). This process will be explained in reference to FIGS. 5A–5D and FIG. 6.

Figure 5A:
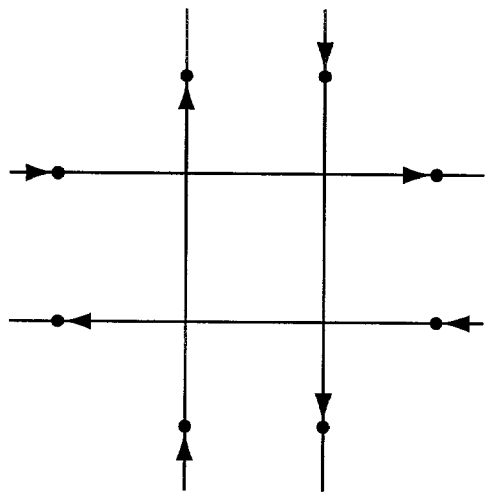
FIGS. 5A–5D are diagrams to explain the outlining process for an outline font.
Figure 5B:
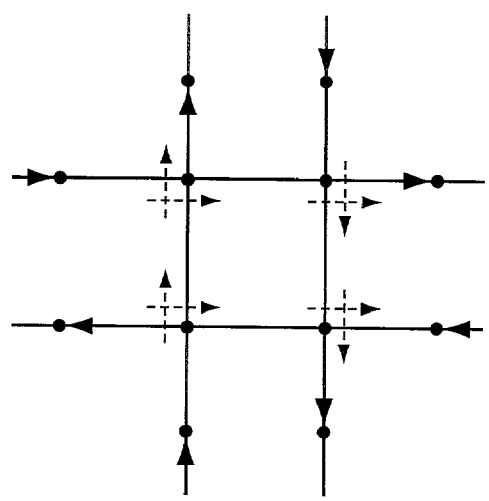

First, when there are graphic paths comprised of each line segment as illustrated in FIG. 5A, the nodal point of each line segment is first computed, and as illustrated in FIG. 5B, a new point is inserted at the position of each nodal point on each of the aforementioned graphic paths. In this state, the continuous directions of line segments intersect with one another as indicated with the broken line arrow in the figure.

Figure 5C:
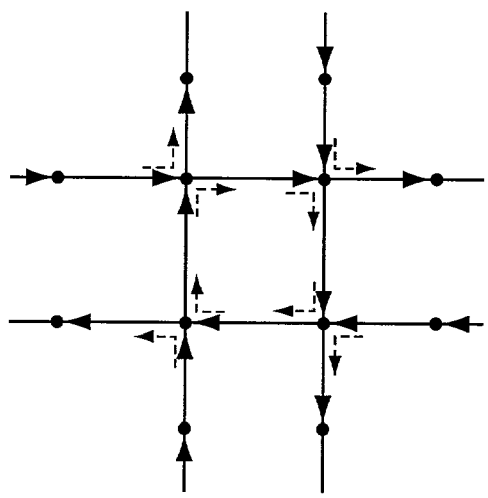

Then, the path exchange unit 18 exchanges the paths between graphic paths at the aforementioned newly inserted points so that the continuous directions of line segments will not intersect with one another. In this manner, the intersection between line segments can be removed as illustrated in FIG. 5C. This procedure will be briefly explained in reference to FIG. 6A and FIG. 6B.

FIG. 6A and FIG. 6B respectively illustrate the states before and after the path exchange. Suppose the points added to the aforementioned intersecting parts are respectively Point B and Point E. Before the path exchange, each path continues in the order of Point A→Point B→Point C, Point D→Point E→Point F, thus intersects at Point B and at Point E. On the other hand, the aforementioned path exchange unit 18 exchanges the paths at these Point B and Point E, and as illustrated in FIG. 6B, causes the paths to continue in the order of Point A→Point B→Point F, Point D→Point E→Point C, thereby cancels the intersection of paths.

Then, the aforementioned path exchange unit 18 determines whether or not the aforementioned process has been applied to all elements (Step A6); and if it has not been, it reads another line segment, returns to Step A4, and continues the process (Step A7).

Figure 5D:
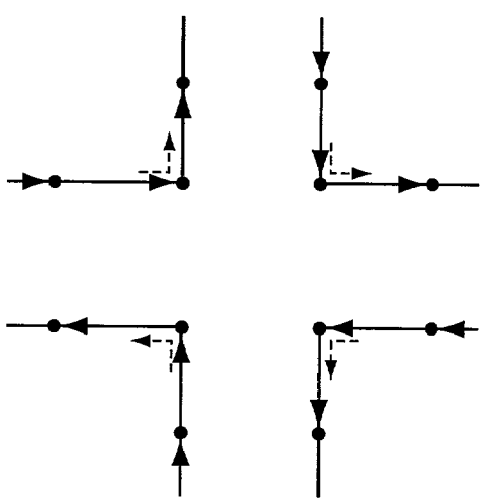
Figure 7:
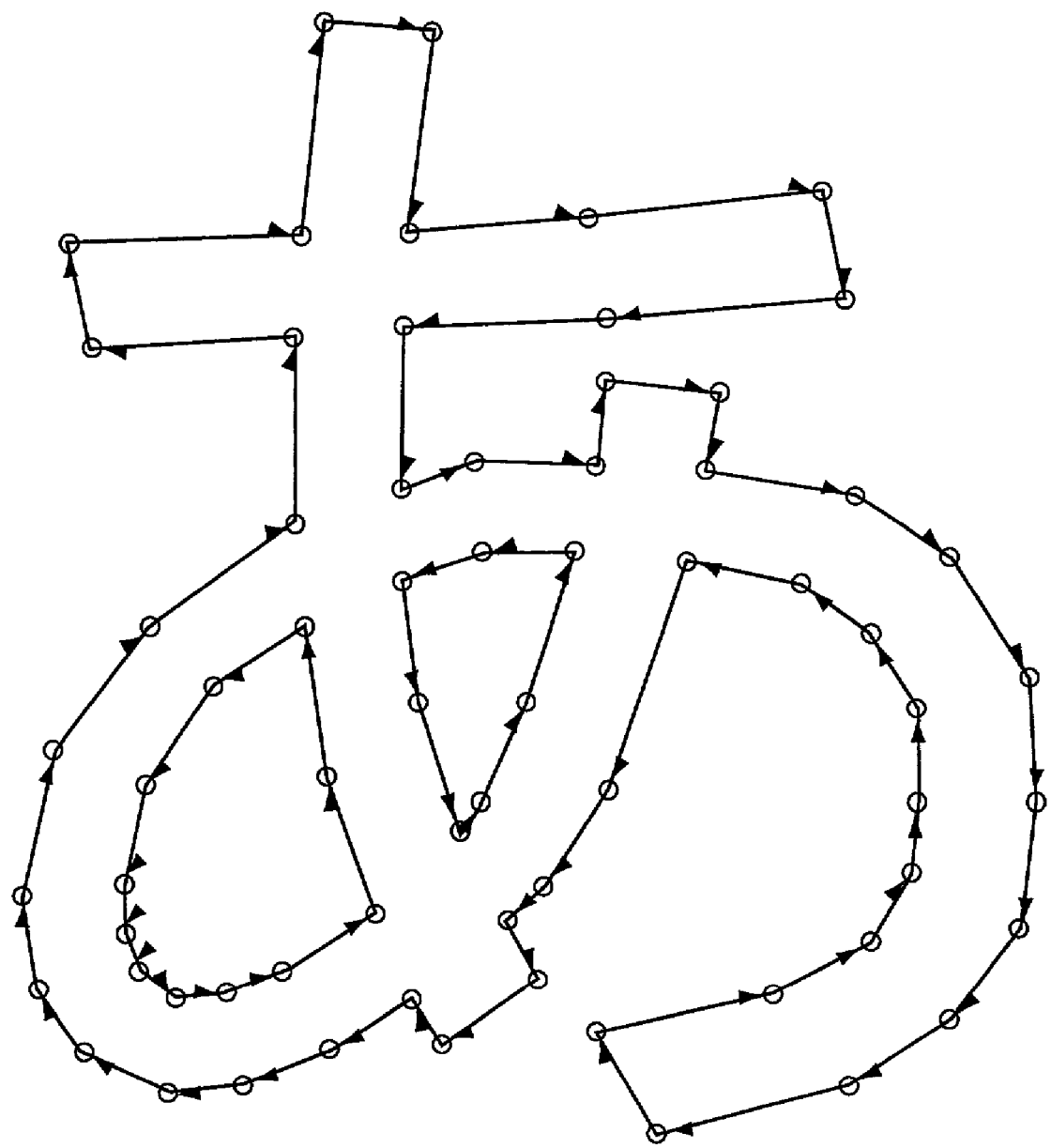
FIG. 7 is a diagram to illustrate the graphic data of outline-processed outline font.

Then, the contained polygonal path-deleting unit 19 deletes unnecessary polygons contained inside of one polygon. Specifically, first, the cyclic direction of each of the aforementioned polygons is obtained (Step A8). Then, with regard to two polygons with the same cyclic direction, it determines whether or not one of them is completely contained inside of the other (Step A9). In the example in FIG. 5C, such a polygon exists. In this case, as illustrated in FIG. 5D, this polygon existing inside is deleted (Step A10). Whether or not this process has been applied to all elements will be determined (Step A11); another polygon is read; the step returns to Step A8; and the process will be continued (Step A12). An example of an area with unnecessary polygons removed in this manner is illustrated in FIG. 7. Compared to FIG. 2A, we can see that only the outline part is plotted.

Next, the skeletonizing process by the aforementioned skeletonizing unit 20 will be explained. The aforementioned skeletonizing unit 20, as illustrated in FIG. 3, has a character width computing unit 27, which computes the character width of an outline font, a line segment moving unit 28, which moves line segments based on the computed character width, and a line synthesizing unit 29, which synthesizes the moved line segments into one line segment. First, the operation of computing character width by the aforementioned character width computing unit 27 will be explained mainly in reference to the flowchart in FIG. 8.

Figure 9:
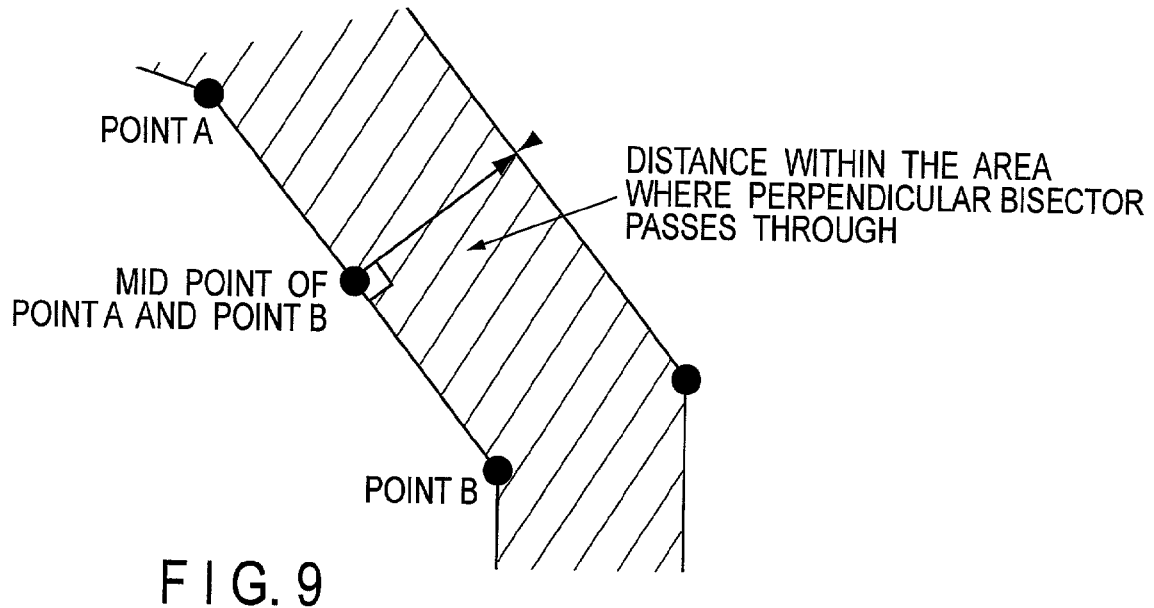
FIG. 9 is a diagram that illustrates an example of character width measurement.

In this application example, the length that appears most often when measurements are made in the direction perpendicular to the outline will be considered the width of the character. That is, when the character width is obtained, first, as illustrated in FIG. 9, for a line segment, the distance for the perpendicular bisector to go through the inside of the area and to get out of the area is obtained. As value that is too large may be entered as the character width, the upper limit value for the distance must be determined and the value in excess of this value must be excluded from the computation. As the measured width will vary depending on the position of measurement, to eliminate this problem, the weighted average with the length of line segment as multiplier will be set as the computational character width when the average of the width is obtained. To obtain this weighted average, it is preferable to prepare a line segment variable L and a multiplier variable M.

Figure 8:
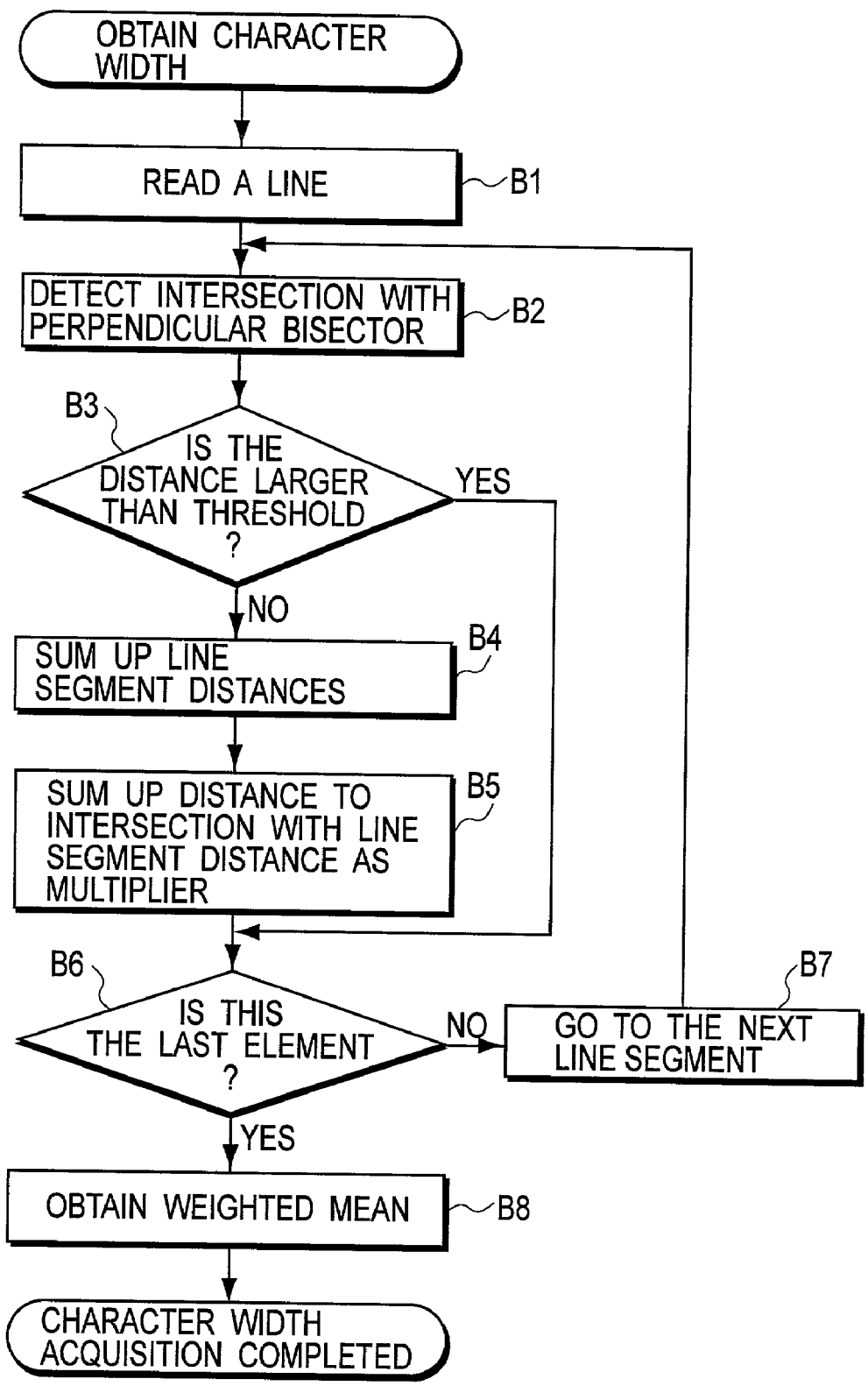
FIG. 8 is a flowchart that illustrates the process of obtaining the character width for an outline font.

Specifically, the aforementioned character width computing unit 27 reads the graphic path data illustrated in FIG. 7 (Step B1 in FIG. 8). For each line segment that constitutes this graphic path, as illustrated in FIG. 9, assuming the perpendicular bisector of this line segment, the distance to the intersection through the inside of the area is computed (Step B2). If this distance is larger than the threshold value, Steps B4 and B5 are ignored (Step B3), and if it is within the threshold value, the distance of line segment is added to the line segment variable L (Step B4), and the product of perpendicular distance multiplied by line segment distance is added to the multiplier variable M (Step B5). Whether or not this process is applied with all elements is determined (Step B6); other lines are read; and the process returns to Step B2, and continues (Step B7). After all computations are completed, the weighted average can be obtained by dividing the multiplier variable by the line segment variable (Step B8). The equation is: M÷L=(Sum of (Line segment distance×Perpendicular distance))÷(Sum of line segment distances)=Weighted average width of a character.

Figure 10:
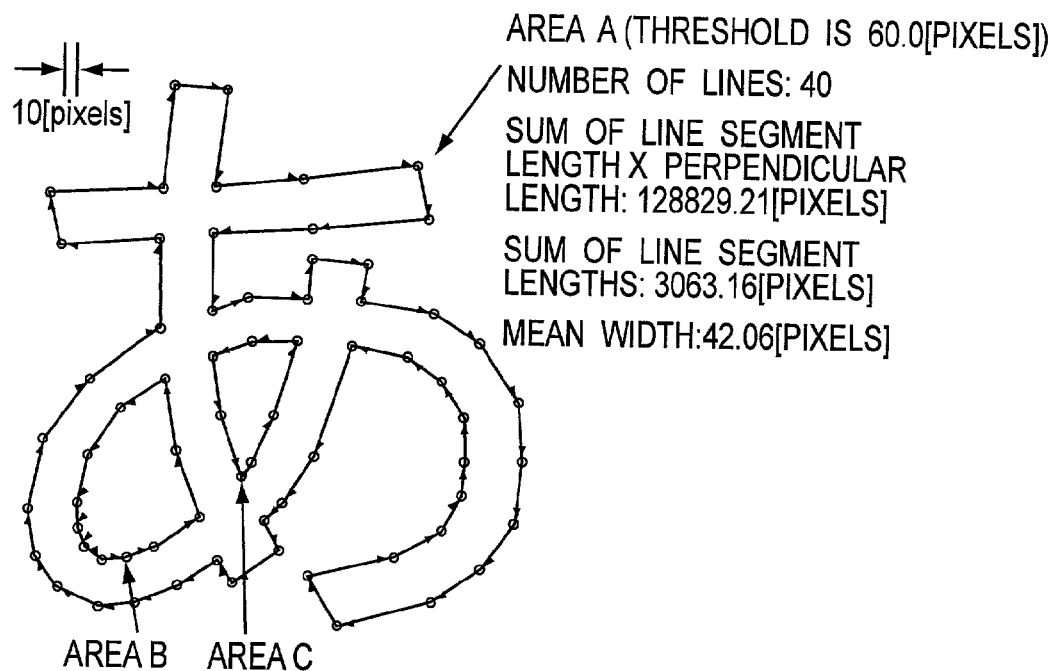
FIG. 10 is a diagram that illustrates an example of obtained character width.

An embodiment according to this computation is illustrated in FIG. 10. As the width of this character varies depending on the polygon, it is necessary to keep a record of the character width for each polygon. However, we did not compute the cut areas (Areas B and C) assuming that they have the same value as that of the plotting area around them.

Figure 11:
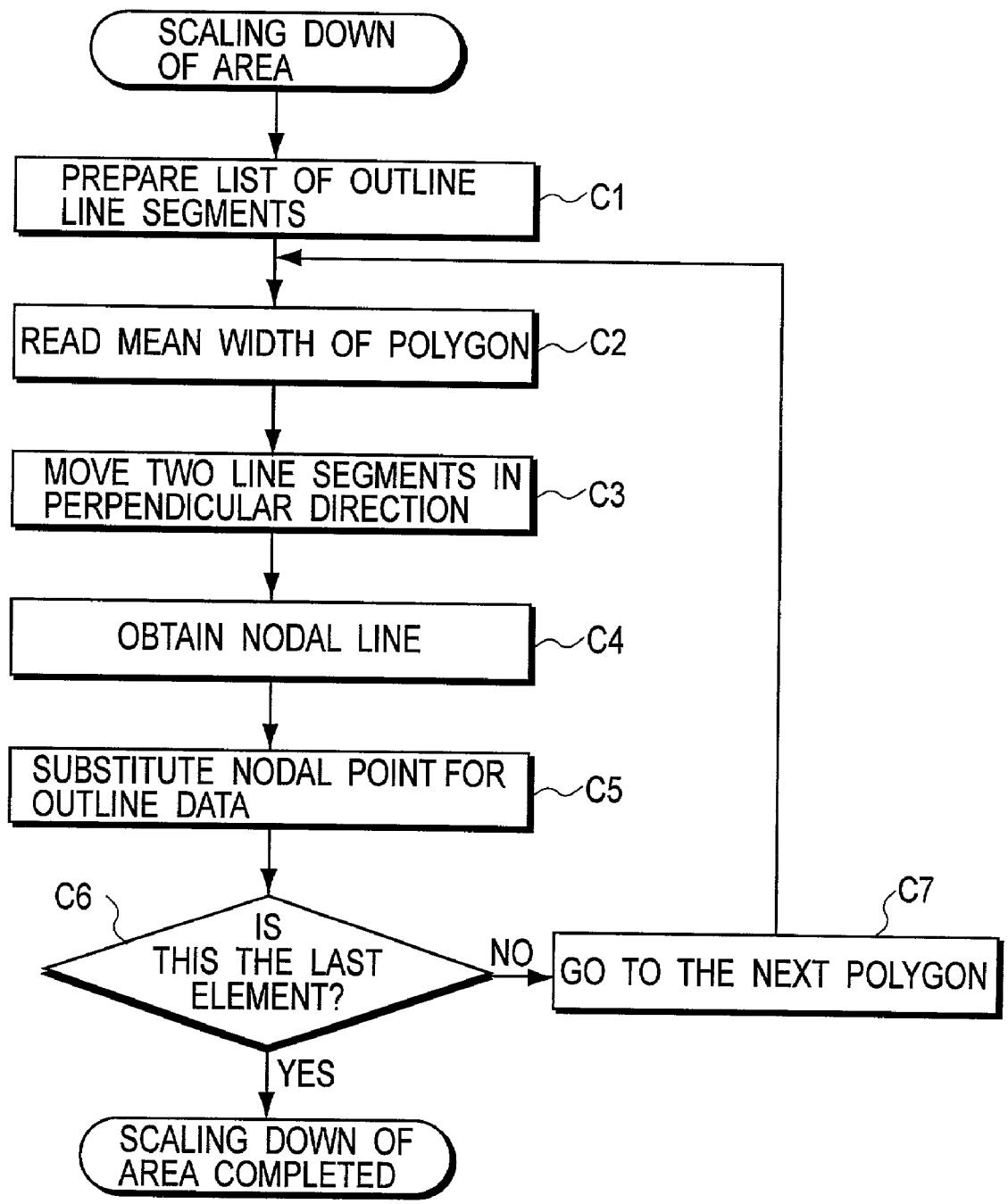
FIG. 11 is a flowchart that illustrates the process of scaling down the area enclosed by an outline for an outline font.

Next, the movement of line segments by the aforementioned line segment moving unit 28 will be explained in reference mainly to the flowchart in FIG. 11. First, in this process, to process and change the outline data constructed as mentioned earlier, first, the data on the line segments that constitute the aforementioned outline is copied in a prescribed area in the memory (Step C1). Then, the character width obtained for each polygon through the character width obtaining process is read (Step C2). Then, line segments and points that are opposite to each other, which constitute this character width, are identified.

Next, the aforementioned line segment moving unit 28 moves each of the aforementioned line segments inside of the area by a length that is half of the character width read (Step C3). In this manner, as illustrated in FIG. 12, a new nodal point K is generated between adjacent line segments, thus, the coordinate of this nodal point K is computed (Step C4), and this nodal point K is substituted for the original starting point or end point (Step C6). In this manner, adjacent line segments will constitute a graphic path that continues through this nodal point.

After the process above has been applied to all points, the same process is executed for the other polygons (Steps C6 and C7). In this manner, a graphic data comprised by evenly scaling down all polygons as illustrated in FIG. 13 can be obtained.

Figure 14:
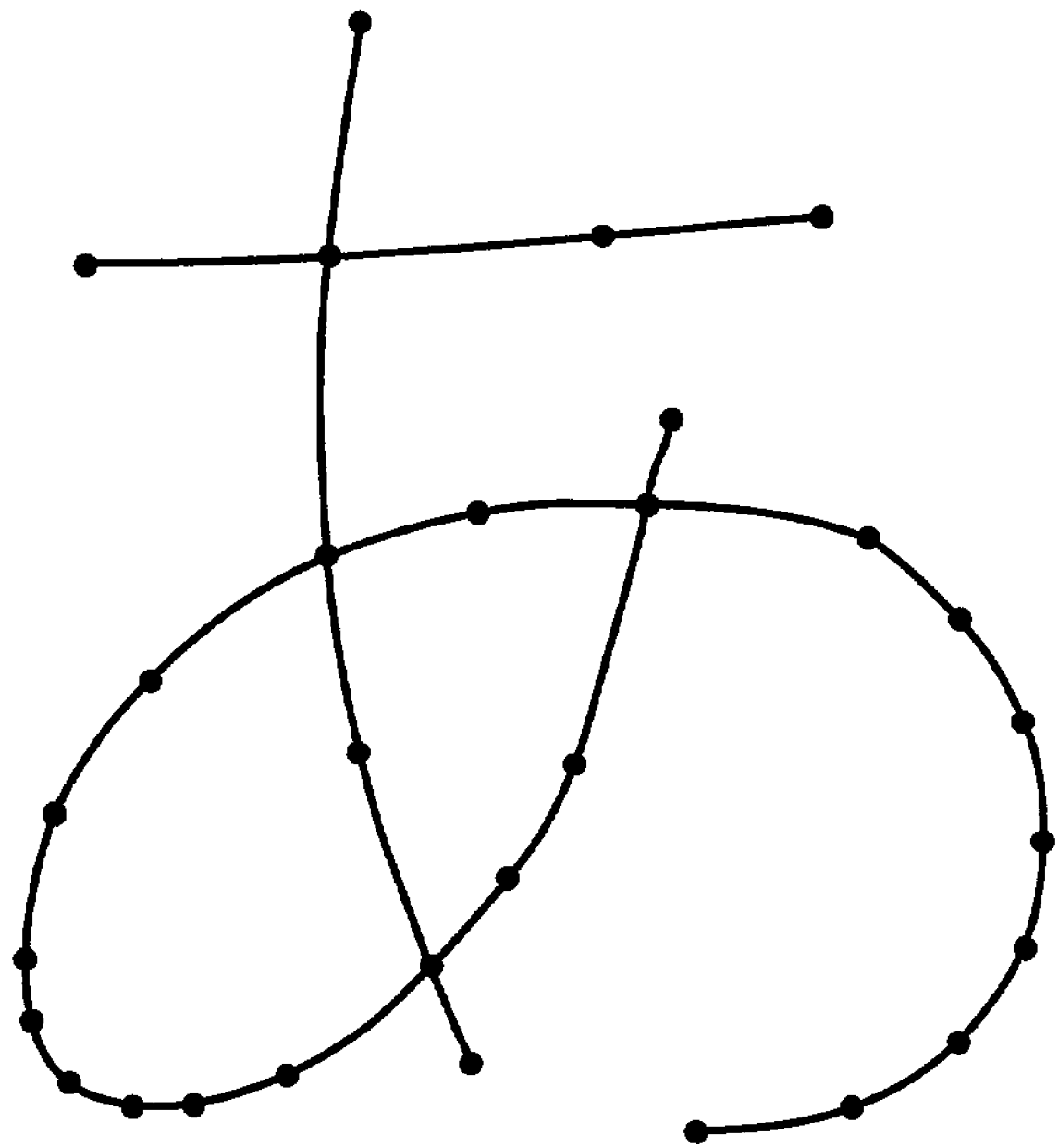
FIG. 14 is a diagram of an outline font after the skeletonizing process.

In this state, the result obtained is almost completely skeletonized. Furthermore, the aforementioned line segment synthesizing unit 29 synthesizes adjacent points and line segments, and the skeletonized data illustrated in FIG. 14 is obtained. This synthesizing process, for instance, is executed by moving two adjacent points to a coordinate in the middle.

On the skeletonized data obtained in this manner, the data that indicates the continuity of line segments does not necessarily follow the stroke order of the character. Thus, in this embodiment, the line segment continuity determining unit 21 and the line segment interconnecting unit 22 renew the data that indicates the continuity of line segments so as to follow the stroke order of the character.

Figure 15:
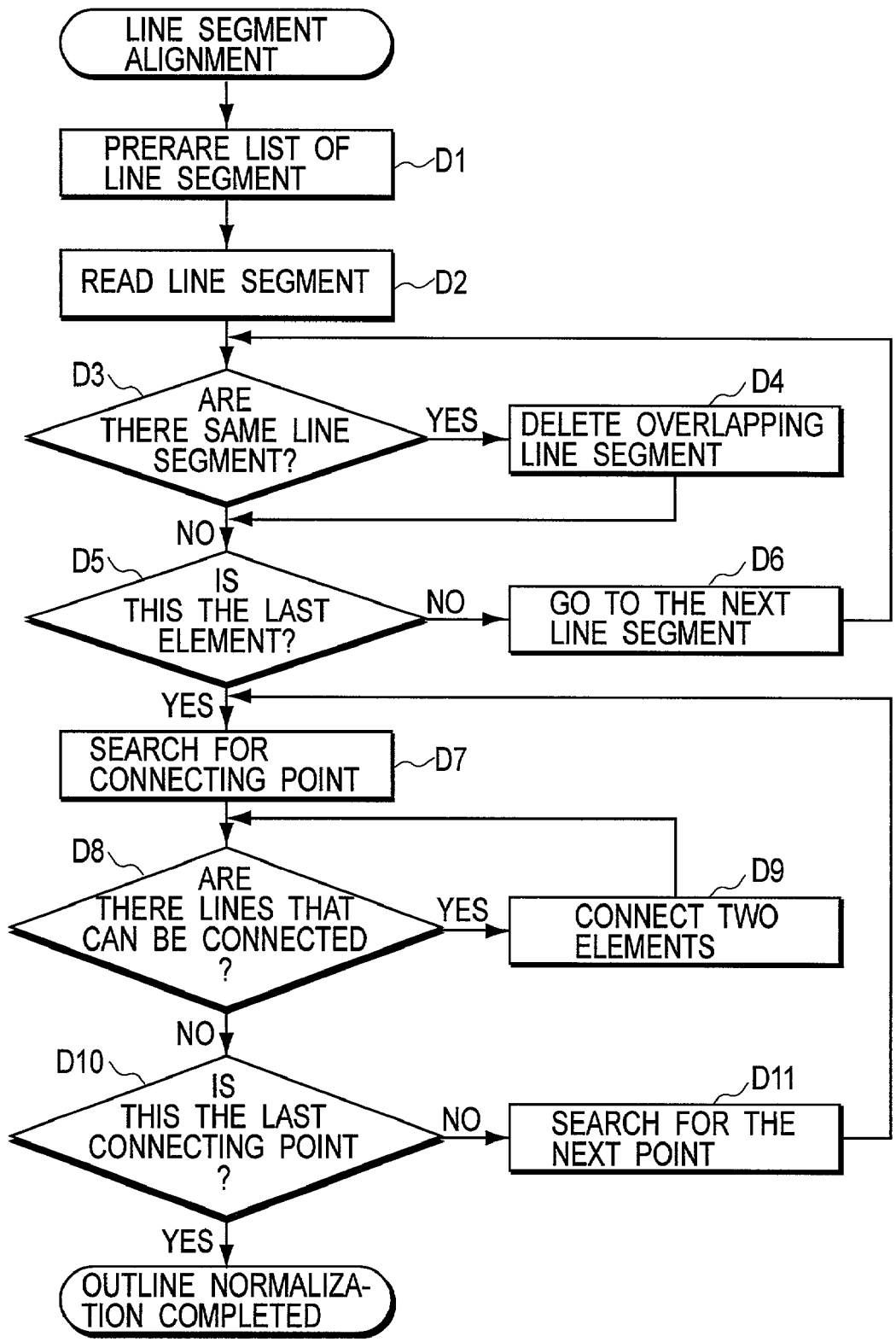
FIG. 15 is a flowchart to explain the process for connecting line segments together after the skeletonizing process.

To do this, first, the aforementioned line segment continuity determining unit 21 divides each of the line segments composed of polygons, and prepares a list of line segments (Step D1 in FIG. 15). Then, it determines whether or not there are overlapping line segments (Step D3). If there are overlapping line segments, one of the line segments is deleted (Step D4). Whether or not this process has been applied to all elements is determined (Step D5), and if it has not been completed, it returns to Step D3 (Step D6), and repeats the same process.

Figure 16:
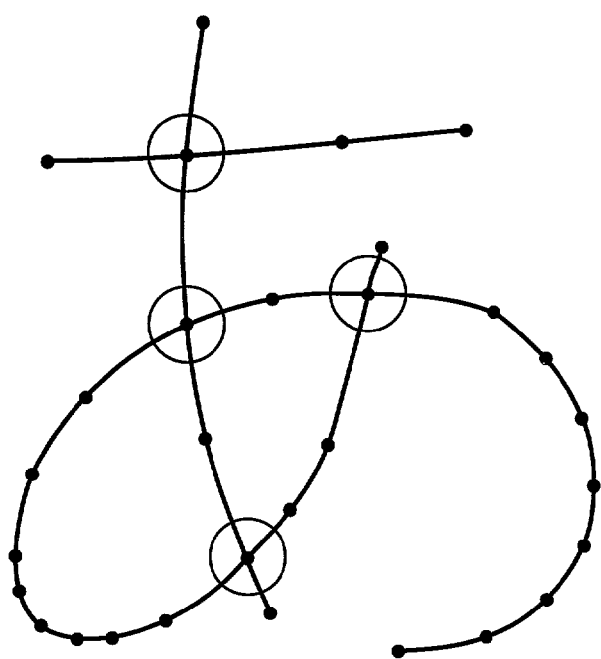
FIG. 16 is a diagram to explain the process to connect line segments together.
Figure 17:
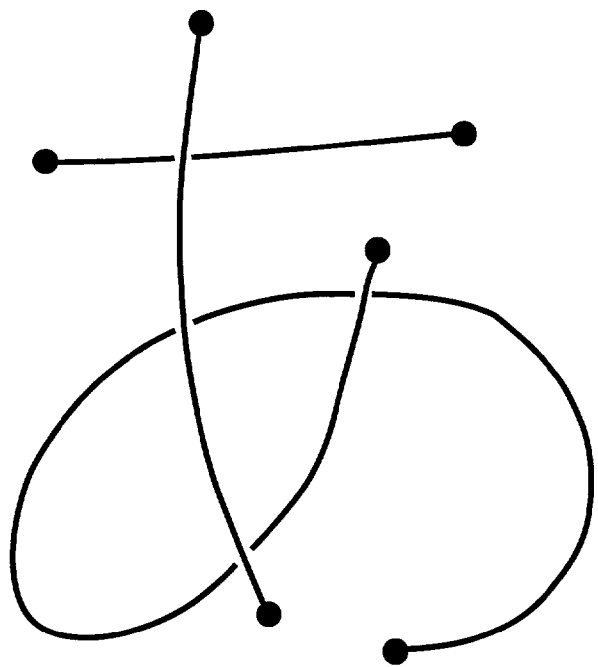
FIG. 17 is a pattern diagram that illustrates the result of connecting line segments together.

Then, from the list of line segments after removing overlapping ones, coordinates wherein two or more points overlap are searched for (Step D7). This coordinate is a connecting point, and the line segments that are connected to this coordinate are searched for (Step D8). Then, from among the line segments that are connected to each connecting point, two line segments that will be connected with the least difference in slope are identified and connected so as to be continuous (Step D9). At a point where three or more line segments are connected as in the case of the part encircled in FIG. 16, line segments will be connected following the stroke order in this process. After the aforementioned process has been applied to all connecting points and all line segments (Step D11), an interconnecting process following the stroke order will be completed as illustrated in FIG. 17 (Step D12). In this manner, a skeletal structure of a character to which ornamental modification process can be applied can be obtained.

Figure 18A:
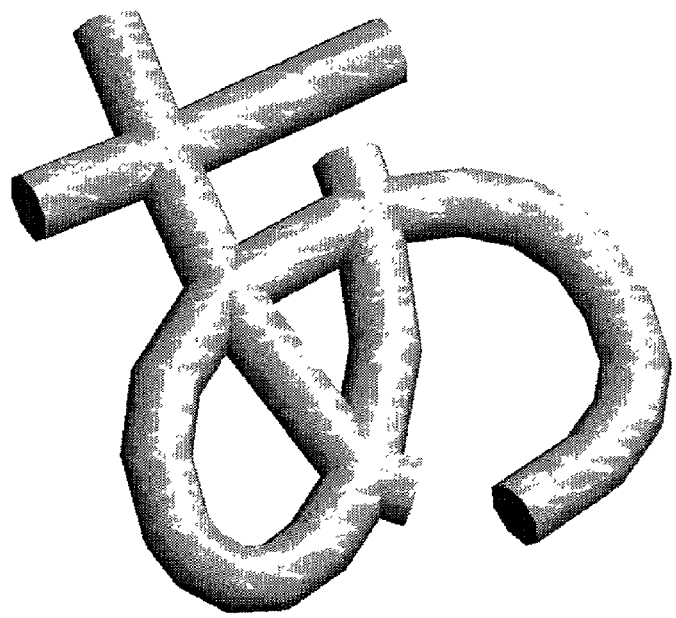
FIGS. 18A and 18B are diagrams that illustrate examples of ornamental modifications.
Figure 18B:
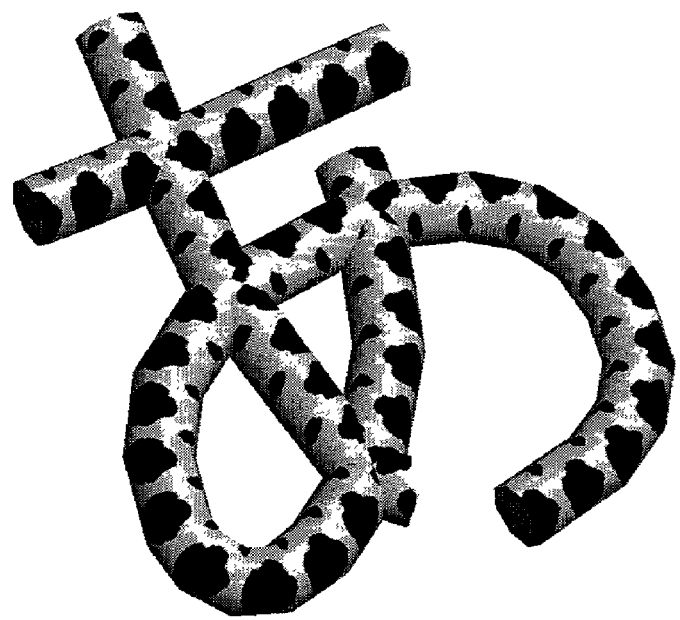

Next, the character ornamental output unit 23 adds ornamental modification based on the skeletal structure obtained above. In this case, to the obtained line sequence, ornamental modification is applied in the prescribed form stored in the aforementioned character ornamentation data 13 (FIG. 3). FIG. 18 A illustrates a state wherein a cylindrical appearance is provided. By adding other conditions such as the end point of line sequence or the angle to the line sequence connection, various three-dimensional expressions can be made. By applying texture process as illustrated in FIG. 18B to the solid three-dimensional structure, which has the outer shape comprised in this manner, an ornamental modification following the structure of the character can be made.

The aforementioned character ornamentation data 13 preferably stores various patterns needed for character ornamentation. For instance, conditions related to the end point of line sequence or the transformation of the connection angle of line sequence, projection condition, three-dimensional forms such as cylinder or prism, texture, image, etc. are pre-patterned, defined and stored.

Figure 19A:
FIGS. 19A–19C are diagrams that illustrate examples of results of applying the same process to outline fonts in other languages.
Figure 19B:
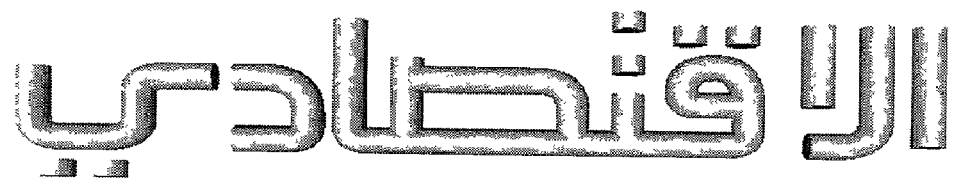
Figure 19C:
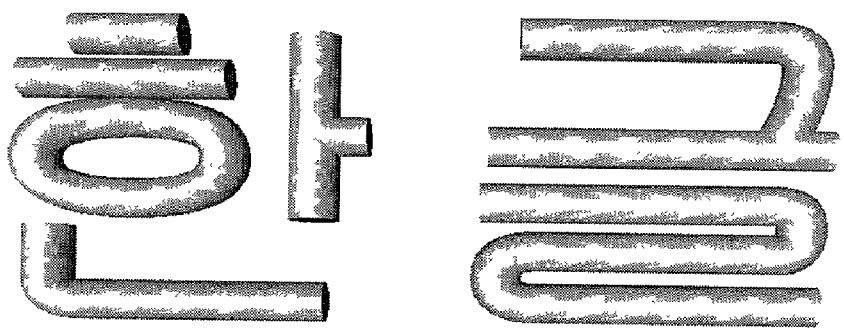

FIGS. 19A, 19B and 19C illustrate examples wherein similar processes are applied respectively to the outline fonts of English, Arabic and Korean languages. According to this invention, as illustrated here, character framework following the stroke order can be obtained in any language, and appropriate ornamental modifications can be applied to them.

The aforementioned character ornamental output unit 23 preferably does not only output the data to which character ornamentation has been applied in this manner as the structural data but can also output it being converted to bitmap data. In this manner, it will be possible to use it directly as image data in various places such as for telops (television opaque projectors) in broadcasting.

Further, this invention is not limited to the aforementioned embodiment. It can be modified in various ways within a scope that does not change the points of the invention.

For instance, while character width was obtained to skeletonize the line in the aforementioned embodiment, the method to skeletonize the line is not limited to this. For instance, instead of obtaining character width, a pair of line segments that specify this character width may be moved by a certain distance to the directions that cause them to approach each other.

What is claimed is:

1. A method for processing outline fonts comprising:
    (a) a step of reading font data from an outline font dictionary that stores the outline data of an outline font which is divided into a plurality of sections,
    (b) a step of preparing a plurality of element structures comprised of the data that causes the outline of an outline font to be plotted, based on the aforementioned font data, which has been read, and constructing a polygonal cyclic graphic path by connecting each element structure in sequence,
    (c) a step of determining whether or not the element structures that constitute the aforementioned polygonal cyclic graphic path intersect element structures that constitute another graphic path, adding a nodal point at the intersecting point of the graphic paths, and exchanging the graphic paths at this nodal point to avoid element structures constituting each polygonal cyclic graphic path from intersecting one another,
    (d) a step of determining whether or not, within one polygonal graphic path, there is another polygonal graphic path that is completely contained and has the same cyclic direction as said one polygonal/graphic path, and deleting said other polygonal graphic path,
    (e) a step of moving the element structures that constitute the aforementioned polygonal cyclic graphic path by a predetermined distance to the direction of character width based on the character width of this outline font, thereby to generate a plurality of line segments comprised by eliminating the character width of the aforementioned outline font, the plurality of line segments together forming a skeletal structure of the aforementioned outline font;
    (f) a step of applying ornamental modification to the skeletal structure to generate an ornamented font outputting the ornamented font to an output device.

2. A method of claim 1, wherein the aforementioned step (e) comprises
    (e-1) a step of obtaining the character width of the outline font based on the aforementioned polygonal graphic path,
    (e-2) a step of moving each continuous line segment in the direction of the aforementioned character width by a distance that is half of the character width, and setting the nodal point of each line segment in that case as a new point that constitutes the aforementioned polygonal cyclic graphic path, and
    (e-3) a step of synthesizing two adjacent line segments into at least one line segment by substituting the coordinates of two points that are adjacent in the character width direction with the coordinate of the midpoint of the two points.

3. A method of claim 2, wherein in the aforementioned step (e-1), with regard to a pair of line segments that constitute the aforementioned character width, the product of the distance from one line segment to the other line segment multiplied by the length of said one line segment is obtained, and such products are summed up for all line segments, and divided by the mean length of all line segments, thereby the mean character width of said character is computed.

4. A method of claim 2, further comprising:
    (g) a step of determining whether or not each of the line segments generated in the aforementioned step (e) is continuous with one another.

5. A method of claim 4, wherein the aforementioned step (g) comprises
    a step for dividing the aforementioned polygonal cyclic graphic path by line segments, and connecting line segments in sequence, two line segments at a time with the least slope difference if more than two line segments meet at one point so as to interconnect the line segments.

6. Computer-readable medium having stored thereon computer software program product comprising computer-executable instructions stored on a computer-readable medium for causing a computer processing system to process outline fonts, the computer readable medium having stored thereon:
    instructions for causing the computer processing system to execute a font data read command, which causes the aforementioned computer system to read font data from an outline font dictionary that stores outline data of an outline font which is divided into a plurality of sections,
    instructions for causing the computer processing system to execute a path constructing command, which causes the aforementioned computer system to prepare a plurality of element structures comprised of the data that causes the outline of an outline font to be plotted based on the aforementioned font data, which has been read, and to construct a polygonal cyclic graphic path by connecting each of the element structures in sequence,
    instructions for causing the computer processing system to execute a path exchange command, which causes the aforementioned computer system to determine whether or not the element structures that constitute the aforementioned polygonal cyclic graphic path intersect element structures that constitute another graphic path, to add a nodal point at the intersecting point of the graphic paths, and to exchange graphic paths at this nodal point to prevent element structures that constitute respective polygonal cyclic graphic paths from intersecting one another,
    instructions for causing the computer processing system to execute a polygonal cyclic graphic path deleting command, which causes the aforementioned computer system to determine whether or not there is another polygonal graphic path that is completely contained in said one polygonal graphic path and has the same cyclic direction as said one polygonal graphic path, and to delete said another polygonal graphic path,
    instructions for causing the computer processing system to execute a skeletonizing command, which causes the aforementioned computer system, with regard to a character comprised of the aforementioned polygonal cyclic graphic paths, to generate a plurality of line segments by deleting the character width of the aforementioned character by letting the line segments opposite to each other in the character width direction approach each other based on the character width, the plurality of line segments together forming a skeletal structure of the character, instructions for causing the computer processing system to execute an ornamental modification command to cause the aforementioned computer system to apply ornamental modifications to the skeletal structure to generate an ornamented font.

7. Computer software program product of claim 6, wherein the aforementioned instructions for causing the computer processing system to execute a skeletonizing command comprises instructions for causing the computer processing system to execute a character width computing command to obtain the character width of an outline font based on the aforementioned polygonal graphic path, instructions for causing the computer processing system to execute a line segment moving command to move each continuous line segment in the direction of the aforementioned character width by a distance half of the character width, thereby to set the nodal point of each line segment at that time as a new point that constitutes the aforementioned polygonal cyclic graphic path, and instructions for causing the computer processing system to execute a line segment synthesizing command to synthesize two adjacent line segments into one line segment by substituting two coordinates that are adjacent in the character width direction with the coordinate of the midpoint of the two points.

8. Computer software program product of claim 7, wherein the instructions for causing the computer processing system to execute a character width computing command, with regard to a pair of line segments that constitute the aforementioned character width, comprises instructions for causing the computer processing system to determine the product of the distance from one line segment to the other line segment multiplied by the length of said one line segment is obtained, to sum such products for all line segments, and to divide the sum by the mean length of all line segments, thereby to compute the mean character width of said character.

9. Computer software program product of claim 7, wherein the computer-readable medium further has stored thereon instructions for causing the computer processing system to execute a line segment continuity determining command to cause the aforementioned computer system to determine whether or not each of the line segments generated in the aforementioned skeletonizing step is continuous to one another.

10. Computer software program product of claim 9, wherein the aforementioned instructions for causing the computer processing system to execute a line segment continuity determining command comprises instructions for causing the computer processing system to execute a line segment interconnecting command to divide the aforementioned polygonal cyclic graphic path by line segment, to extract non-overlapping line segments, to connect line segments at the connecting point of the line segments in sequence from two line segments with the least difference in slope, and thereby to interconnect the line segments.

* * * * *